(12) United States Patent
Hsu et al.

(10) Patent No.: US 11,642,614 B1
(45) Date of Patent: May 9, 2023

(54) REUSABLE ACTIVATED CARBON FILTER

(71) Applicant: AC Infinity Inc., City of Industry, CA (US)

(72) Inventors: Daniel Yu Hsu, Upland, CA (US); Wilbur Y. Cheng, Chino Hills, CA (US); Jimmy Liu, Brea, CA (US)

( * ) Notice: Subject to any disclaimer, the term of this patent is extended or adjusted under 35 U.S.C. 154(b) by 0 days.

(21) Appl. No.: 17/964,790

(22) Filed: Oct. 12, 2022

(51) Int. Cl.
- *B01D 53/00* (2006.01)
- *B01D 39/20* (2006.01)
- B01D 53/04 (2006.01)
- B01D 27/02 (2006.01)

(52) U.S. Cl.
CPC .......... *B01D 39/2065* (2013.01); *B01D 27/02* (2013.01); *B01D 53/0415* (2013.01); *B01D 2253/102* (2013.01)

(58) Field of Classification Search
CPC ........................ B01D 39/2065; B01D 27/02; B01D 53/0415; B01D 2253/102
USPC ................................ 96/136, 139; 128/205.12
See application file for complete search history.

(56) References Cited

U.S. PATENT DOCUMENTS

| | | | | |
|---|---|---|---|---|
| 2,537,992 A * | 1/1951 | Gross | ..................... | A62B 23/00 55/498 |
| 8,246,727 B2 * | 8/2012 | Comrie | ................. | B01D 53/508 96/138 |
| 9,764,965 B1 * | 9/2017 | Nohren, Jr. | .......... | B01D 46/527 |
| 10,159,857 B2 * | 12/2018 | Key | .......................... | A62B 7/10 |
| 2005/0247201 A1 * | 11/2005 | Arno | ................... | B01D 53/0415 55/515 |
| 2007/0267337 A1 * | 11/2007 | Yang | ..................... | B01D 27/144 166/227 |
| 2010/0242966 A1 * | 9/2010 | Johnson | ................... | B63C 11/24 128/205.12 |
| 2011/0203583 A1 * | 8/2011 | Cozean | ............. | A61M 16/0093 128/203.12 |
| 2011/0308524 A1 * | 12/2011 | Brey | ....................... | A62B 23/02 128/205.12 |
| 2014/0137743 A1 * | 5/2014 | Reeh | ................... | B01D 53/0415 96/151 |
| 2014/0158640 A1 * | 6/2014 | Elliott | ...................... | C02F 1/505 210/764 |
| 2014/0305307 A1 * | 10/2014 | Mugica Elorza | ...... | A23B 7/152 96/108 |

(Continued)

*Primary Examiner* — T. Bennett McKenzie
(74) *Attorney, Agent, or Firm* — Tommy S F Wang; Wang IP Law Group, P.C.

(57) ABSTRACT

A reusable activated carbon filter is disclosed. It comprises: an outer mesh hollow cylinder, having a plurality of meshes formed thereon; an inner mesh hollow cylinder, having a plurality of meshes formed thereon, located inside the outer mesh hollow cylinder; two fixing rings, each having a plurality of long curved openings and a plurality of fixing holes, and fixing the outer mesh hollow cylinder and the inner mesh hollow cylinder at the same end; two flexible padding rings, each having a plurality of fixing protrusions, and detachably padding the long curved openings of one of the fixing rings with one fixing protrusion plugged in one corresponding fixing hole; a top connector, removably connected to one fixing ring, having a connecting opening for connecting to an inline fan; and a bottom cover, connected to the other fixing ring. Activated carbon granules are filled between the two mesh hollow cylinders.

8 Claims, 16 Drawing Sheets

(56) References Cited

U.S. PATENT DOCUMENTS

| | | | | |
|---|---|---|---|---|
| 2015/0367060 A1* | 12/2015 | Gerber | ............... | A61M 1/1696 |
| | | | | 210/85 |
| 2016/0325222 A1* | 11/2016 | Campbell | .......... | B01D 46/0093 |
| 2017/0304765 A1* | 10/2017 | Chou | ................. | B60K 15/0406 |
| 2019/0015774 A1* | 1/2019 | Tirone | .............. | B01D 46/0005 |

* cited by examiner

REUSABLE ACTIVATED CARBON FILTER

FIELD OF THE INVENTION

The present application relates to an activated carbon filter. More particularly, the present application relates to a reusable activated carbon filter.

BACKGROUND OF THE INVENTION

Activated carbon filters are devices to remove volatile organic compounds (VOCs), odors, and other gaseous pollutants (hereinafter collectively referred to as gaseous substance) from the air in the surrounding environment. They are designed to filter the gaseous substances through activated carbon (charcoal) contained therein. In the history, humans have been using charcoal to purify water for thousands of years. Through improvement, activated carbon comes from charcoal that has undergone some additional processing can make it better at trapping gas molecules.

Activated carbon filters remove the gaseous substances from the air by a process of adsorption. During adsorption, the gaseous substances stick to the outside of the activated carbon, rather than being absorbed inside. There is a problem with the passage of time that the gaseous substances increasingly fill up the adsorption sites of the activated carbon. Finally, the activated carbon becomes saturated and no more gaseous substances can be adsorbed and removed. To this end, the activated carbon should be abandoned. Some activated carbon filters are designed to be compatible with an inline fan, allowing for the airflow passing through the inline fan to be scrubbed by the activated carbon. For this kind of activated carbon filters, they are one time use. Namely, there are extra hardware fixing the activated carbon. If the activated carbon in the activated carbon filter has to be disposed of when it is no longer effective, the extra hardware will be discarded, too. The extra hardware is usually made of stainless steel. It causes a waste of useful materials. On the other hand, the discarded extra hardware is an impact to the environment.

In order to reduce the long-term cost of the activated carbon filters and the environmental impact, an innovative reusable activated carbon filter is disclosed.

SUMMARY OF THE INVENTION

This paragraph extracts and compiles some features of the present application; other features will be disclosed in the follow-up paragraphs. It is intended to cover various modifications and similar arrangements included within the spirit and scope of the appended claims.

In order to settle the problems mentioned above, a reusable activated carbon filter is disclosed. The reusable activated carbon filter comprises: an outer mesh hollow cylinder, having two first openings on two ends, respectively, and a plurality of meshes formed thereon; an inner mesh hollow cylinder, having two second openings on two ends, respectively, and a plurality of meshes formed thereon, located inside the outer mesh hollow cylinder; two fixing rings, each having a plurality of long curved openings and a plurality of fixing holes, and fixing the outer mesh hollow cylinder and the inner mesh hollow cylinder at the same end; two flexible padding rings, each having a plurality of fixing protrusions, and detachably padding the long curved openings of one of the fixing rings with one fixing protrusion plugged in one corresponding fixing hole; a top connector, removably connected to one fixing ring, having a connecting opening for connecting to an inline fan; and a bottom cover, connected to the other fixing ring. Activated carbon granules are filled between the outer mesh hollow cylinder and the inner mesh hollow cylinder. An aperture of the meshes is smaller than the shortest external dimension of the activated carbon granules. The activated carbon granules are able to be replenished and removed through the long curved openings.

According to the present application, the fixing ring may further comprise: an inner ring wall, having a plurality of external thread segments formed thereon; a first outer ring wall, concentrically formed outside the inner ring wall; and a plurality of connecting ribs, connecting the inner ring wall and the first outer ring wall. A space enclosed by the inner ring wall, the first outer ring wall and two adjacent connecting ribs forms one long curved opening.

According to the present application, the top connector may further comprise: a top flange, comprising: a pipe portion, forming the connecting opening; and a flange portion, extended from one end of the pipe portion, forming an annular groove; and a first internal ring lid, having an internal thread formed in an inner ring side thereof, fixed in the annular groove with the internal thread revealed for detachably rotationally connecting with the external thread segments. A first hanging ring may be fixed on an edge of the flange portion.

According to the present application, the bottom may further comprise: a bottom flange, comprising: a center portion, protruding to the inside of the inner mesh hollow cylinder; and a flange portion, extended from the edge of the center portion, having a second outer ring wall; and a second internal ring lid, having an internal thread formed in an inner ring side thereof, fixed in a valley between the center portion and the second outer ring wall. A space between the second internal ring lid and the center portion allows the inner ring wall to be rotationally inserted with internal thread detachably rotationally connected with the external thread segments. A second hanging ring may be fixed on an edge of the bottom flange.

According to the present application, the first outer ring wall abuts the inside of the outer mesh hollow cylinder, and the inner ring wall abuts the outside of the inner mesh hollow cylinder. The flexible padding ring has a plurality of padding protrusions formed with the fixing protrusions on the same side. A shape of each padding protrusion is the same as that of the long curved opening. Each padding protrusion is used to detachably pad one corresponding long curved opening of one of the fixing rings.

Preferably, the outer mesh hollow cylinder is made of metal. The inner mesh hollow cylinder is made of metal. The flexible padding ring is made of silicone or rubber. The fixing ring is made of plastic. The top flange is made of metal. The first internal ring lid is made of plastic. The bottom flange is made of metal. The second internal ring lid is made of plastic. The funnel is made of metal or plastic.

The reusable activated carbon filter allows the activated carbon granules inside to be removable and refillable once they are no longer effective by an innovative design of the outer mesh hollow cylinder, the inner mesh hollow cylinder, two fixing rings, two flexible padding rings, the top connector and the bottom cover. All these components can be reused and will not be thrown away with saturated activated carbon granules. Meanwhile, the reusable activated carbon filter is easily assembled with the components. The present application prevents waste of materials, reduces the long-term cost of the activated carbon filter and lowers the environmental impact.

DETAILED DESCRIPTION OF THE PREFERRED EMBODIMENTS

The present application will now be described more specifically with reference to the following embodiments.

Figure 1:
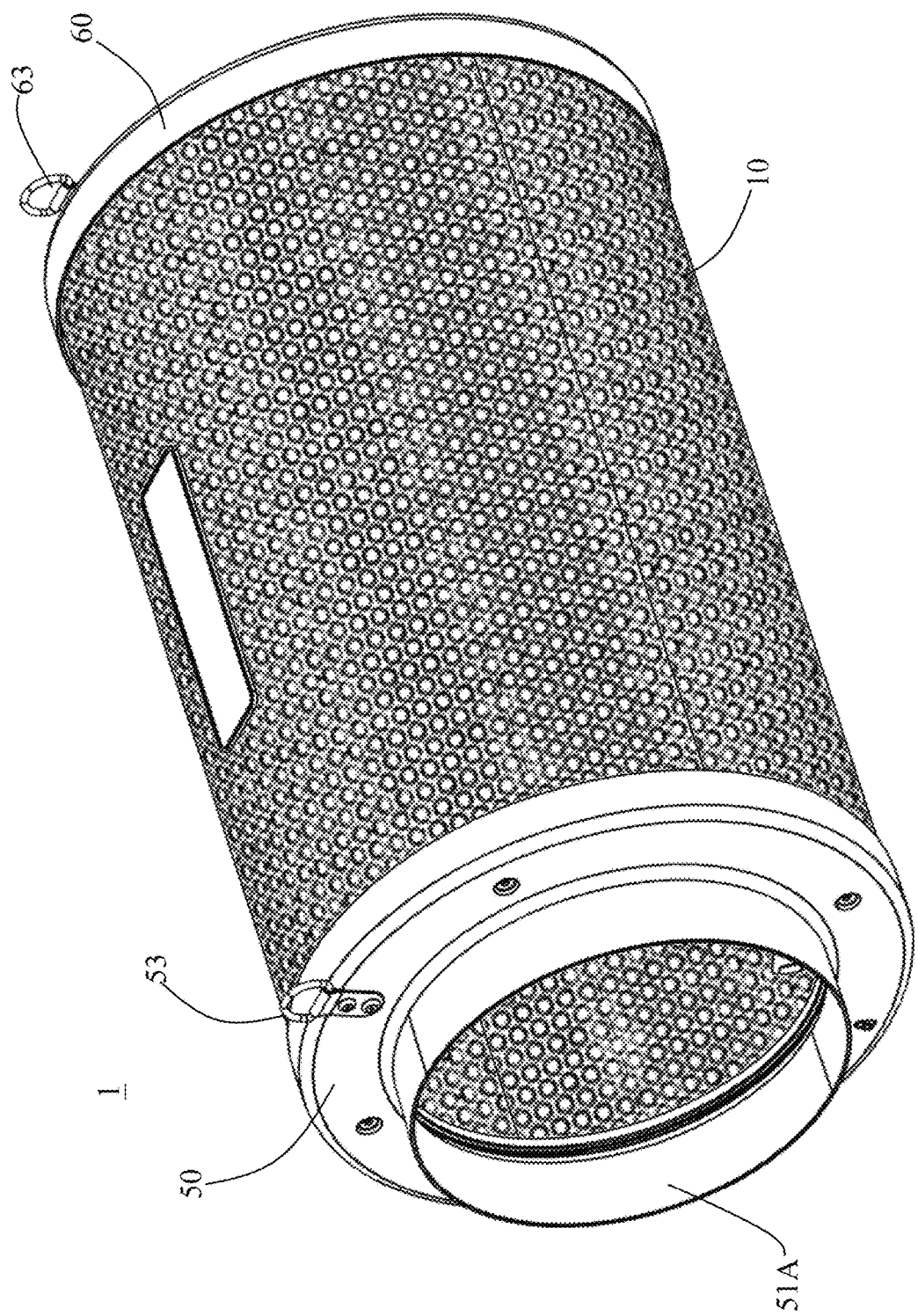
FIG. 1 is a stereogram of a reusable activated carbon filter according to an embodiment of the present application.
Figure 2:
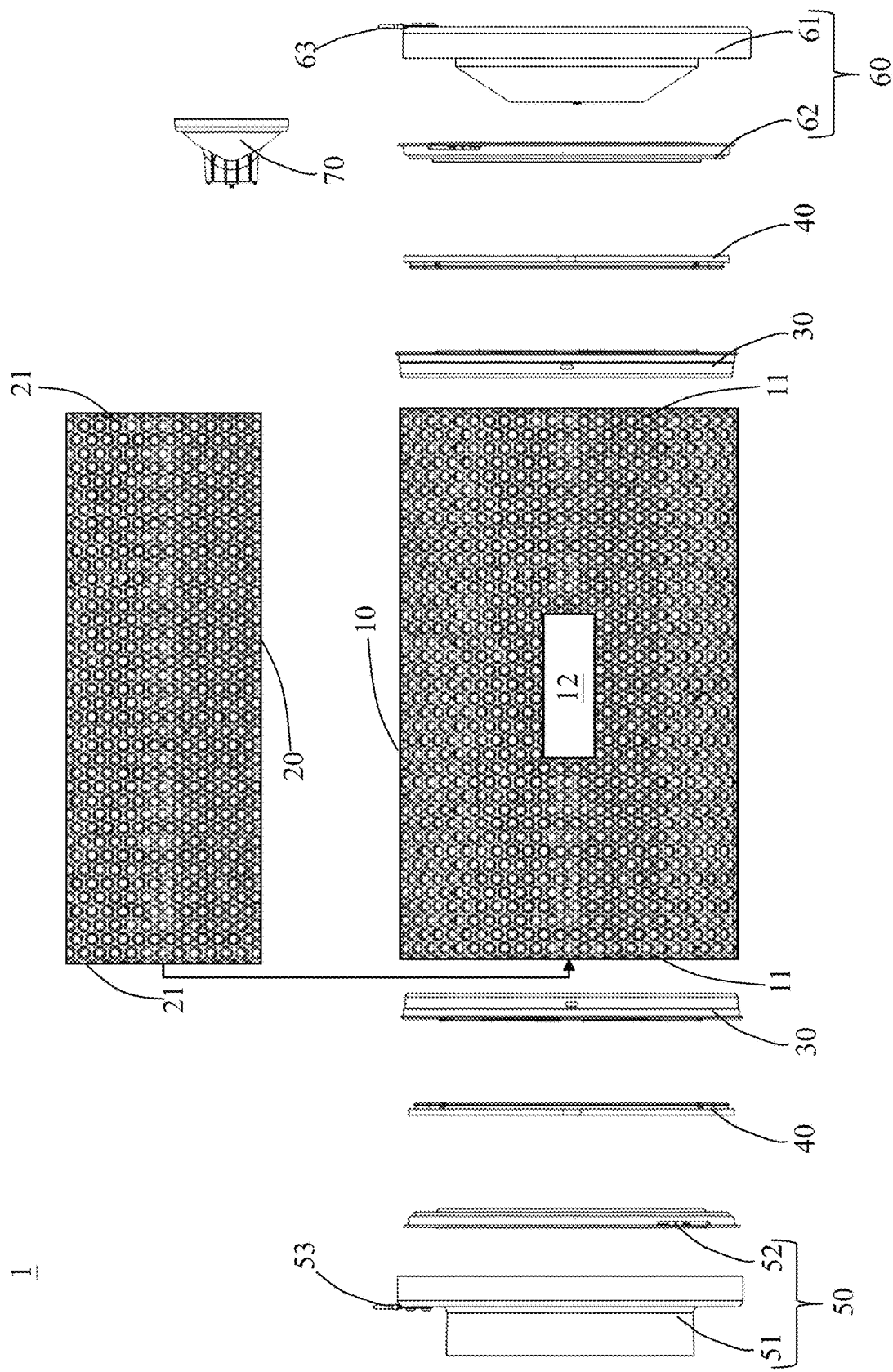
FIG. 2 is an exploded diagram of the reusable activated carbon filter.

See FIG. 1 and FIG. 2. FIG. 1 is a stereogram of a reusable activated carbon filter 1 according to an embodiment of the present application. FIG. 2 is an exploded diagram of the reusable activated carbon filter 1. The reusable activated carbon filter 1 comprises an outer mesh hollow cylinder 10, an inner mesh hollow cylinder 20, two fixing rings 30, two flexible padding rings 40, a top connector 50, a bottom cover 60 and a funnel 70. Appearance, architecture and functions of the technical components mentioned above will be disclosed in detail below.

The outer mesh hollow cylinder 10 is the outermost structure on the side of the reusable activated carbon filter 1. It allows air needed to be filtered to follow in or out while fresh activated carbon granules are stored inside. The outer mesh hollow cylinder 10 has two first openings 11 on two ends, respectively. The two ends are flat viewed from the side. A number of meshes are formed on the outer mesh hollow cylinder 10. They are the channels that air goes in and out for filtering. Shape of the meshes is not restricted. It may be circle, triangle, square, hexagon, etc. Material-wise, the outer mesh hollow cylinder 10 may be made of metal, e.g., aluminum alloy (1060 grade) or SPCC steel. If necessary, there may be a nameplate 12 fixed on the surface of the outer mesh hollow cylinder 10 for showing any messages about the reusable activated carbon filter 1.

The inner mesh hollow cylinder 20 is the innermost structure of the reusable activated carbon filter 1. It functions like the outer mesh hollow cylinder 10 to allows air to follow in or out and fixes the activated carbon granules with the outer mesh hollow cylinder 10. Similarly, the inner mesh hollow cylinder 20 has two second openings 21 on two ends, respectively. A number of meshes are formed on the inner mesh hollow cylinder 20, too. Features of the meshes of the inner mesh hollow cylinder 20 are the same as that of the outer mesh hollow cylinder 10 and are not illustrated again. In the reusable activated carbon filter 1, the inner mesh hollow cylinder 20 is located inside the outer mesh hollow cylinder 10 as indicated by an arrow line in FIG. 2. In order to have a better understanding of this, refer to FIG. 3. It is a cross section cutting through the outer mesh hollow cylinder 10 and the inner mesh hollow cylinder 20 of the reusable activated carbon filter 1. The cross-sectional shape of the outer mesh hollow cylinder 10 and that of the inner mesh hollow cylinder 20 are both a circle. The outer mesh hollow cylinder 10 and the inner mesh hollow cylinder 20 are arranged concentrically that the inner mesh hollow cylinder 20 is enclosed by the outer mesh hollow cylinder 10. In practice, the shape of the cross-section of the outer mesh hollow cylinder 10 and the inner mesh hollow cylinder 20 is not limited to a circle. Any plane symmetrical pattern is preferrable.

Figure 3:
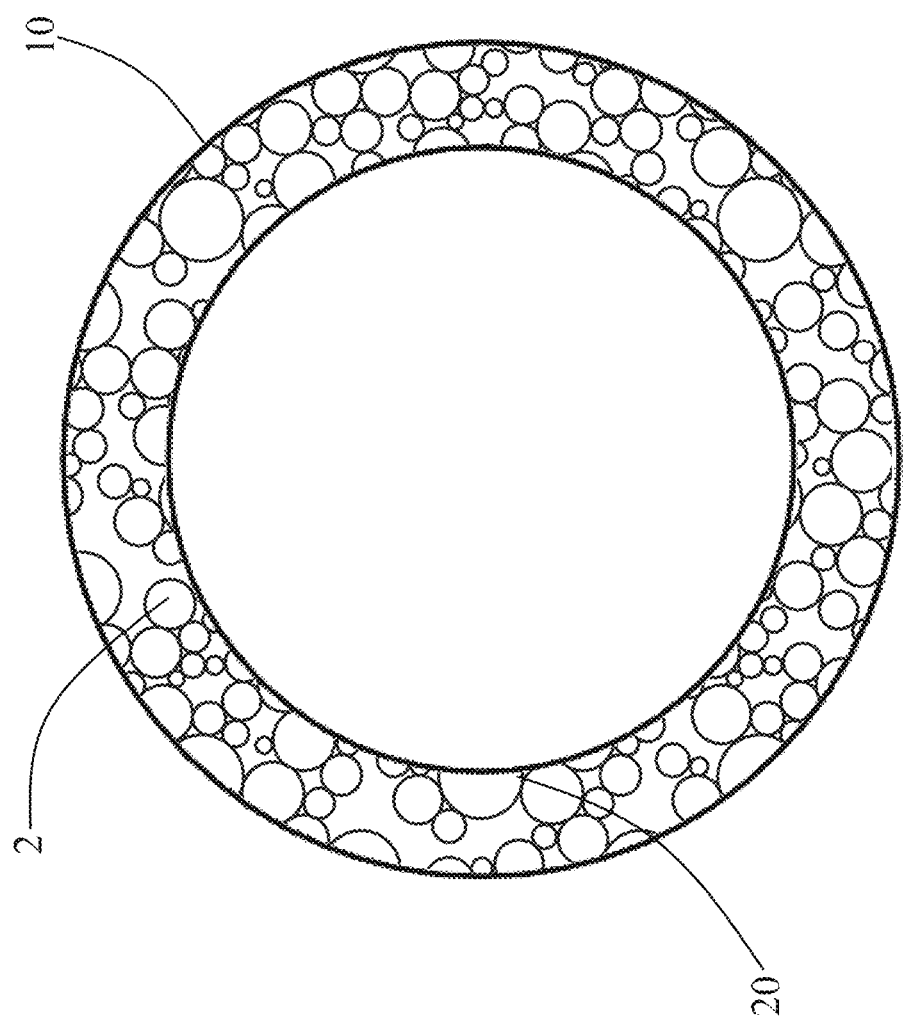
FIG. 3. is a cross section cutting through an outer mesh hollow cylinder and an inner mesh hollow cylinder of the reusable activated carbon filter.

As shown in FIG. 3. Activated carbon granules 2 are filled between the outer mesh hollow cylinder 10 and the inner mesh hollow cylinder 20. Since the activated carbon granules 2 are not firmly held by the two mesh hollow cylinders, when the activated carbon granules 2 are saturated and adsorption of the gaseous substances is no more functioned, they can be taken out and a new batch of activated carbon granules 2 can be replenished. However, in case the activated carbon granules 2 may fall out of the space between the outer mesh hollow cylinder 10 and the inner mesh hollow cylinder 20, an aperture of the meshes should be smaller than the shortest external dimension of the activated carbon granules 2. The size of the activated carbon granules 2 sold in the market is fixed, so control of the size of the meshes can prevent the activated carbon granules 2 from falling. Of course, the activated carbon granules 2 may be smashed by hitting each other. Dust of the smashed activated carbon granules 2 can fall out of the outer mesh hollow cylinder 10 or the inner mesh hollow cylinder 20 through the meshes.

The direction of air flow is determined by an inline fan connected to the reusable activated carbon filter 1. If the inline fan sucks air out of the reusable activated carbon filter 1, air flows from the outer mesh hollow cylinder 10 to the inner mesh hollow cylinder 20 and is filtered by the activated carbon granules 2. On the contrary, if the inline fan blows air to the reusable activated carbon filter 1, air flows from the inner mesh hollow cylinder 20 to the outer mesh hollow cylinder 10 and is filtered by the activated carbon granules 2. Material-wise, like the outer mesh hollow cylinder 10, the inner mesh hollow cylinder 20 may be made of metal, such as aluminum alloy (1060 grade) or stainless steel.

Figure 4:
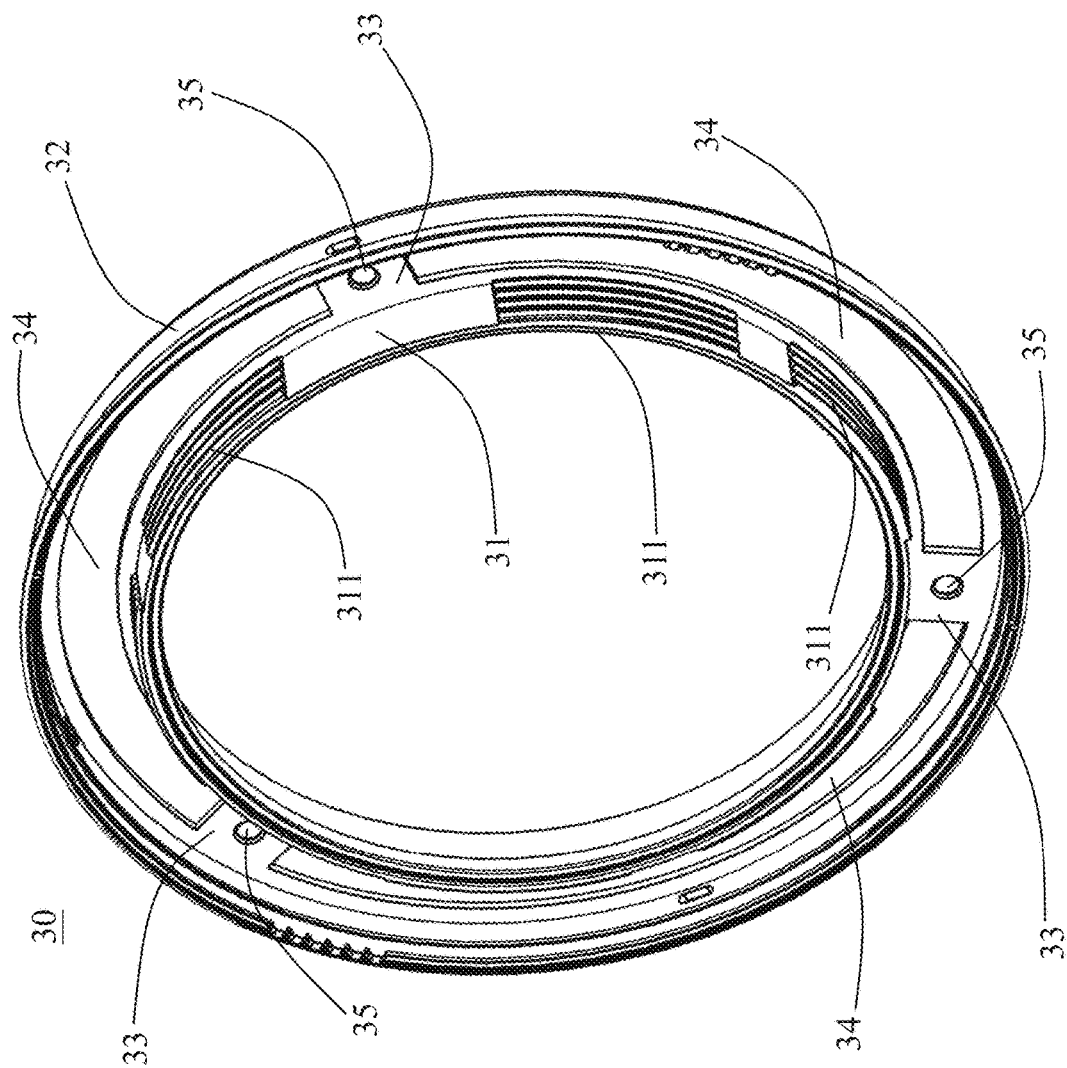
FIG. 4 is a stereogram of a fixing ring.

Since the outer mesh hollow cylinder 10 and the inner mesh hollow cylinder 20 are independent and unconnected elements, if the relative positions of the two mesh hollow cylinders need to be fixed, components for fixing them are required. The fixing rings 30 are the required components. The two fixing rings 30 are identical but used in different locations of the reusable activated carbon filter 1. Refer to FIG. 4. It is a stereogram of the fixing ring 30. Each of the fixing rings 30 is composed of three substructures: an inner ring wall 31, a first outer ring wall 32 and a number of connecting ribs 33. The inner ring wall 31 has a number of external thread segments 311 formed on itself. The external thread segments 311 are used to connect the top connector 50 and the bottom cover 60. It will be illustrated later on. Although the external thread segments 311 are disconnected, they form a complete external thread with some missing parts. In other embodiment, a complete external thread may be used instead. The first outer ring wall 32 is concentrically formed outside the inner ring wall 31. The connecting ribs 33 connect the inner ring wall 31 and the first outer ring wall 32. In this embodiment, 3 long curved openings 31 are used for illustration. In practice, the number of the long curved openings 31 may be 2, 4, or larger. The fixing ring 30 has a number of long curved openings 34. A space enclosed by the inner ring wall 31, the first outer ring wall 32 and two adjacent connecting ribs 33 forms one long curved opening 34. Therefore, there are 3 long curved openings 34 in the embodiment. The fixing ring 30 also has a number of fixing holes 35. One fixing hole 35 is formed on one connecting rib 33 and the number of fixing holes 35 is also 3.

Figure 5:
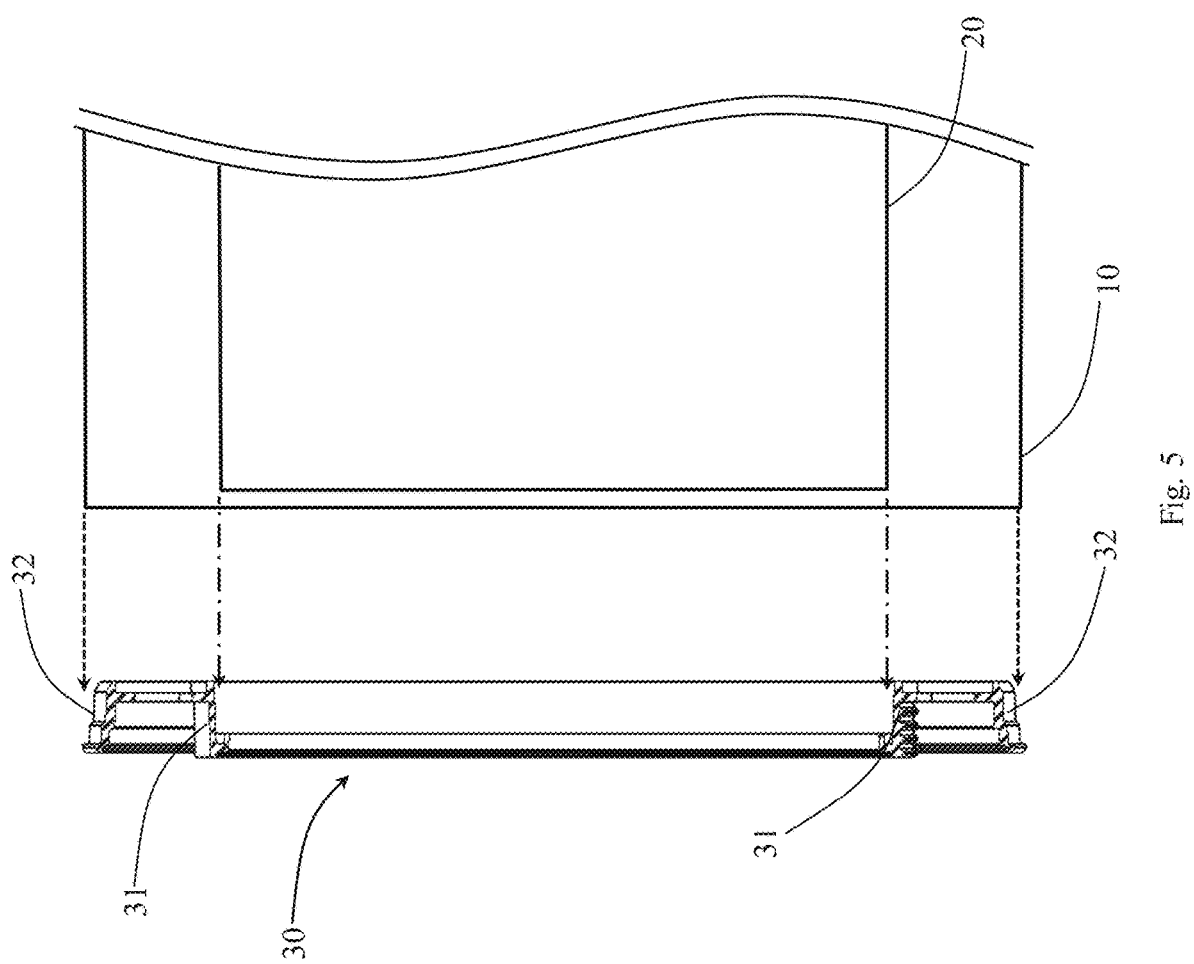
FIG. 5 is a sectional view of the outer mesh hollow cylinder, the inner mesh hollow cylinder and the fixing ring.

Each of the fixing rings 30 fixes the outer mesh hollow cylinder 10 and the inner mesh hollow cylinder 20 at the same end. In order to have a better understanding of this, please refer to FIG. 5. It is a sectional view of the outer mesh hollow cylinder 10, the inner mesh hollow cylinder 20 and the fixing ring 30. According to the present application, the openings of the outer mesh hollow cylinder 10 and the inner mesh hollow cylinder 20 at the same end are aligned. In order to differentiate the mesh hollow cylinders, a location of the opening of the inner mesh hollow cylinder 20 is drawn a little bit indented than that of the outer mesh hollow cylinder 10. As shown in FIG. 5, when the outer mesh hollow cylinder 10 connects to the fixing ring 30, along the direction shown by dashed line arrow, the first outer ring wall 32 abuts the inside of the outer mesh hollow cylinder 10. When the inner mesh hollow cylinder 20 connects to the fixing ring 30, along the direction shown by dashed dotted line arrow, the inner ring wall 31 abuts the outside of the inner mesh hollow cylinder 20. The other fixing ring 30 on the other side does the same. Thus, the relative positions of the outer mesh hollow cylinder 10 and the inner mesh hollow cylinder 20 are fixed by the fixing rings 30. Material-wise, the fixing ring 30 is better made of plastic, e.g., ABS.

Figure 6:
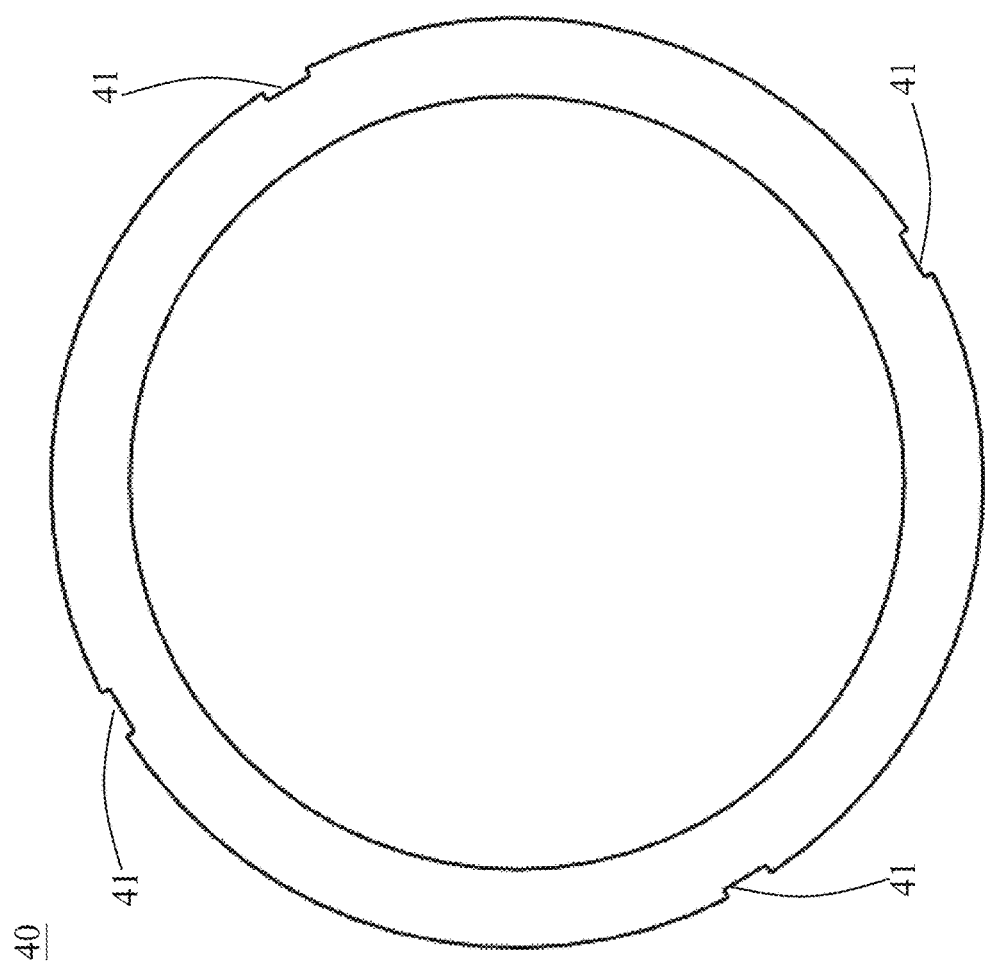
FIG. 6 is a top view of a flexible padding ring.
Figure 7:
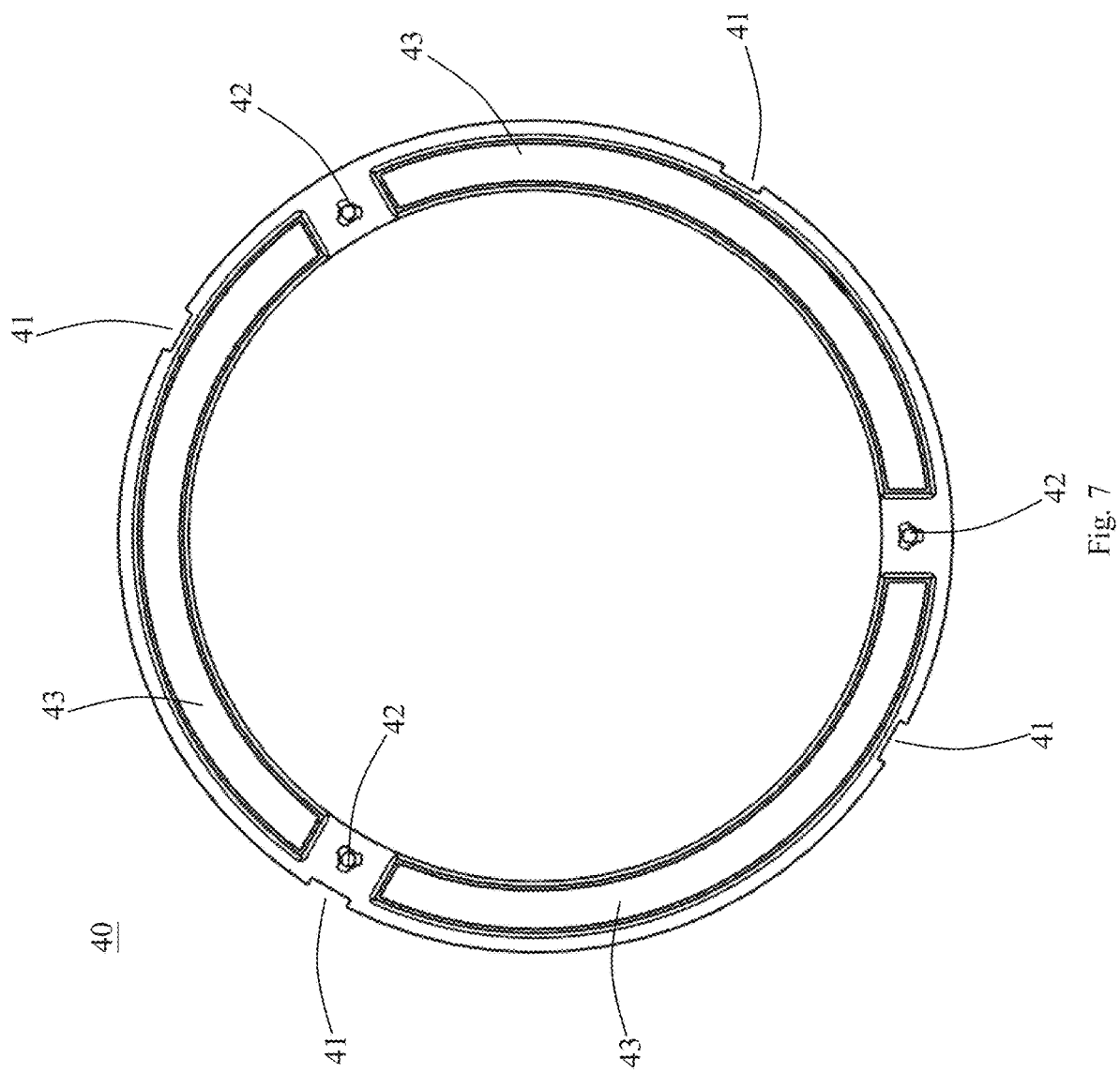
FIG. 7 is a bottom view of the flexible padding ring.
Figure 8:
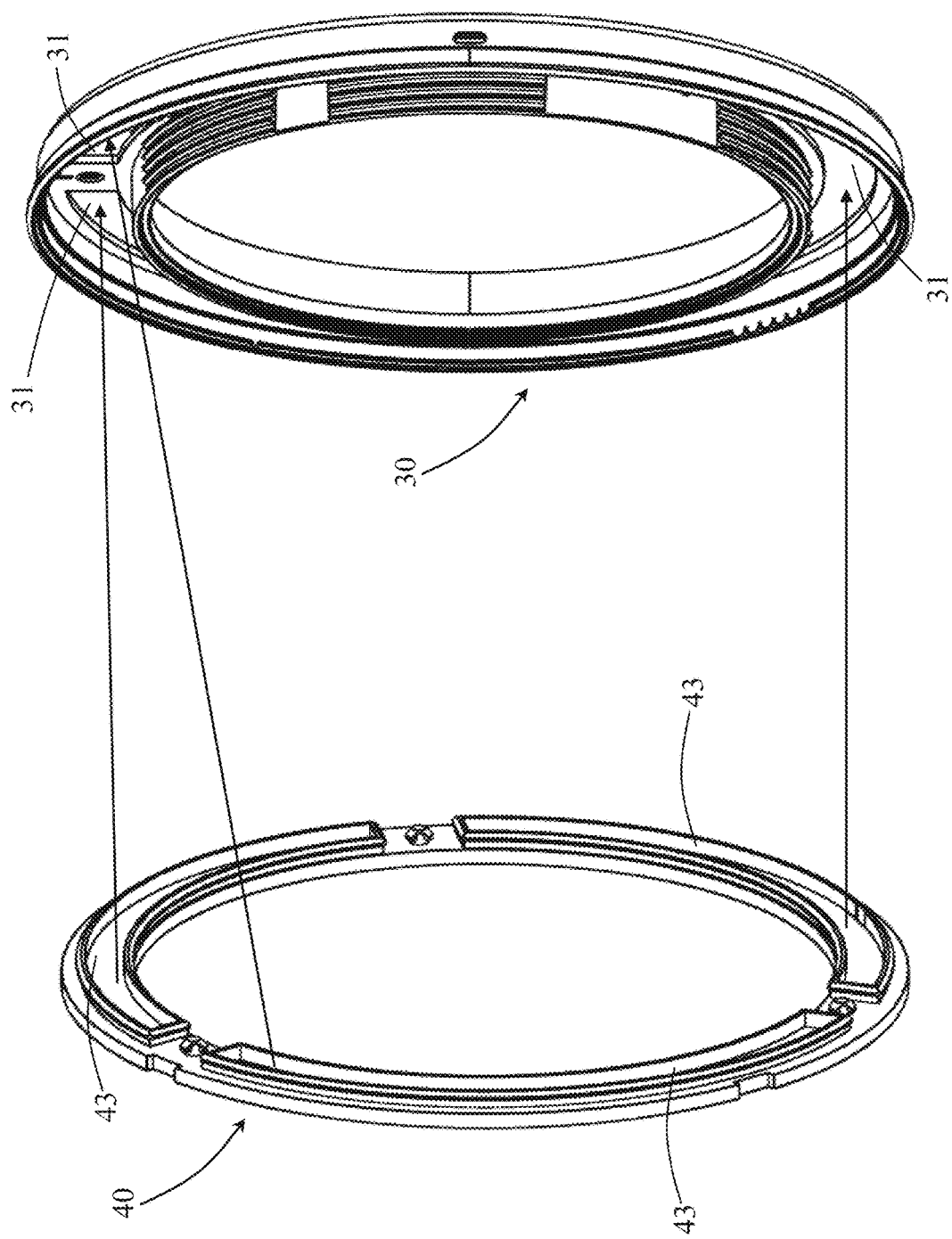
FIG. 8 is a stereoscopic view of the flexible padding ring and the fixing ring, viewing along a central divider between the two.

See FIG. 6 and FIG. 7. FIG. 6 is a top view of the flexible padding ring 40. FIG. 7 is a bottom view of the flexible padding ring 40. Activated carbon granules are filled between the outer mesh hollow cylinder 10 and the inner mesh hollow cylinder 20. However, activated carbon granules will easily fall out of the mesh hollow cylinders through the long curved openings 34. The flexible padding ring 40 is used to pad the long curved openings 34. The two flexible padding rings 40 are identical. Since it is flexible, flexible padding ring 40 is better made of silicone or rubber. FIG. 6 is a rear view of the flexible padding ring 40. There are several notches 41 in the edge of the flexible padding ring 40. 4 notches 41 are used for illustration in this embodiment. In fact, the number of the notches 4 by fingers when the flexible padding ring 40 is connected with the fixing ring 30. FIG. 7 is a front view of the flexible padding ring 40. Each of the two flexible padding rings 40 has a number of fixing protrusions 42 which protrude towards the normal of the page. The flexible padding ring 40 also has a number of padding protrusions 43 formed with the fixing protrusions 42 on the same side. A shape of each padding protrusion 43 is the same as that of the long curved opening 31. Sizes of the padding protrusion 43 and the long curved opening 31 are the same. See FIG. 8. It is a stereoscopic view of the flexible padding ring 40 and the fixing ring 30, viewing along a central divider (an imaginary plane) between the two. Each padding protrusion 43 is used to detachably pad one corresponding long curved opening 31 of one of the fixing rings 30 indicated by the arrow lines. In practice, the size of the padding protrusion 43 can be a little larger than that of the long curved opening 31. This is because the padding protrusion 43 is flexible and when the padding protrusion 43 is deformed to insert into the long curved opening 31, swell force of the padding protrusion 43 can make it snap tighter. The number of the fixing protrusions 42 is the same as that of the fixing hole 35. Therefore, the flexible padding ring 40 is able to detachably pad the long curved openings 31 of one of the fixing rings 30 with one fixing protrusion 42 plugged in one corresponding fixing hole 35. With the flexible padding rings 40, the activated carbon granules are able to be replenished and removed through the long curved openings 31 and will not fall out of the reusable activated carbon filter 1 when using.

Figure 9:
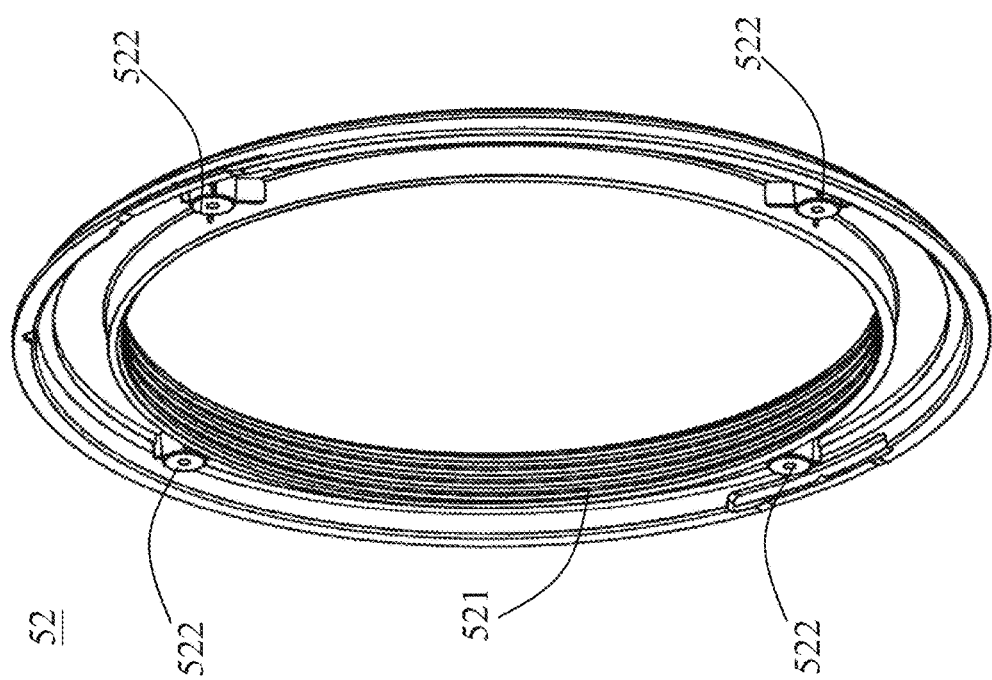
FIG. 9 is a stereogram of a first internal ring lid.
Figure 10:
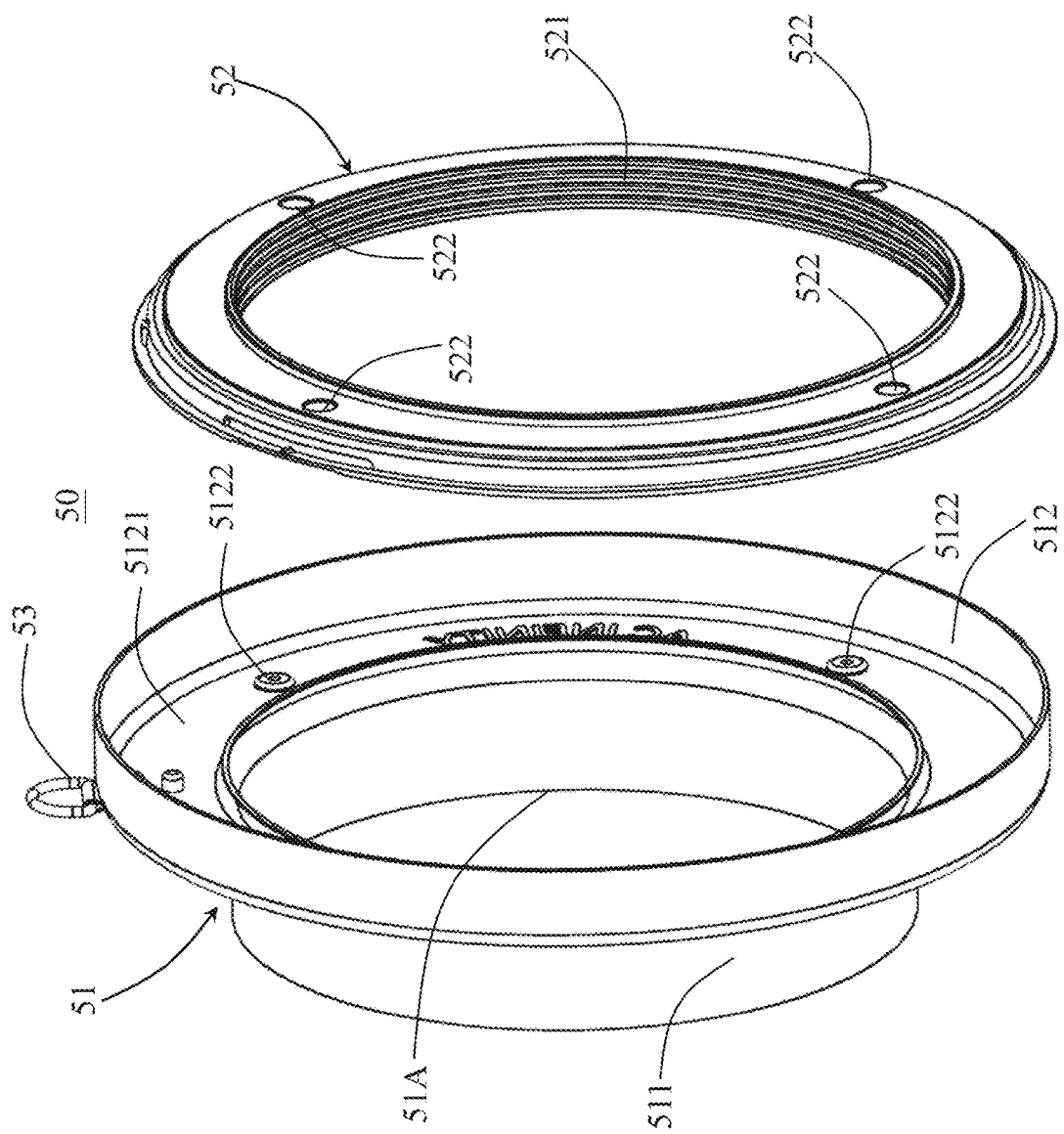
FIG. 10 is a stereogram showing a top flange and the first internal ring lid in a separated state.

Refer to FIG. 9 and FIG. 10. FIG. 9 is a stereogram of a first internal ring lid 52. FIG. 10 is a stereogram showing a top flange 51 and the first internal ring lid 52 in a separated state. The first internal ring lid 52 in FIG. 9 and. FIG. 10 show different sides. The top flange 51 and the first internal ring lid 52 are the components of the top connector 50. The top connector 50 can removably connected to one fixing ring 30 and have a connecting opening 51A for connecting to an inline fan. The top connector 50 can also seal one end of the reusable activated carbon filter 1. Connection with the inline fan will be described later. The top flange 51 comprises a pipe portion 511 and a flange portion 512. The pipe portion 511 looks like a short pipe. It is a main body to form the connecting opening 51A. The flange portion 512 is extended from one end of the pipe portion 511. It forms an annular groove 5121. The first internal ring lid 52 has an internal thread 521 formed in an inner ring side of itself. The first internal ring lid 52 is not a flat structure but protrudes to one side. The first internal ring lid 52 is fixed in the annular groove 5121 with the internal thread 512 revealed for detachably rotationally connecting with the external thread segments 311. A way to fix the first internal ring lid 52 is by screws screwed through the screw holes 522 on the first internal ring lid 52 and fixed in the screw placement points 5122. The top connector 50 needs to be connected with the inline fan. Therefore, the material of the top flange 51 must be solid. According to the present application, the top flange 51 is made of metal, such as steel or aluminum alloy (1060 grade). Meanwhile, the first internal ring lid 52 may be made of plastic, e.g., ABS.

Figure 11:
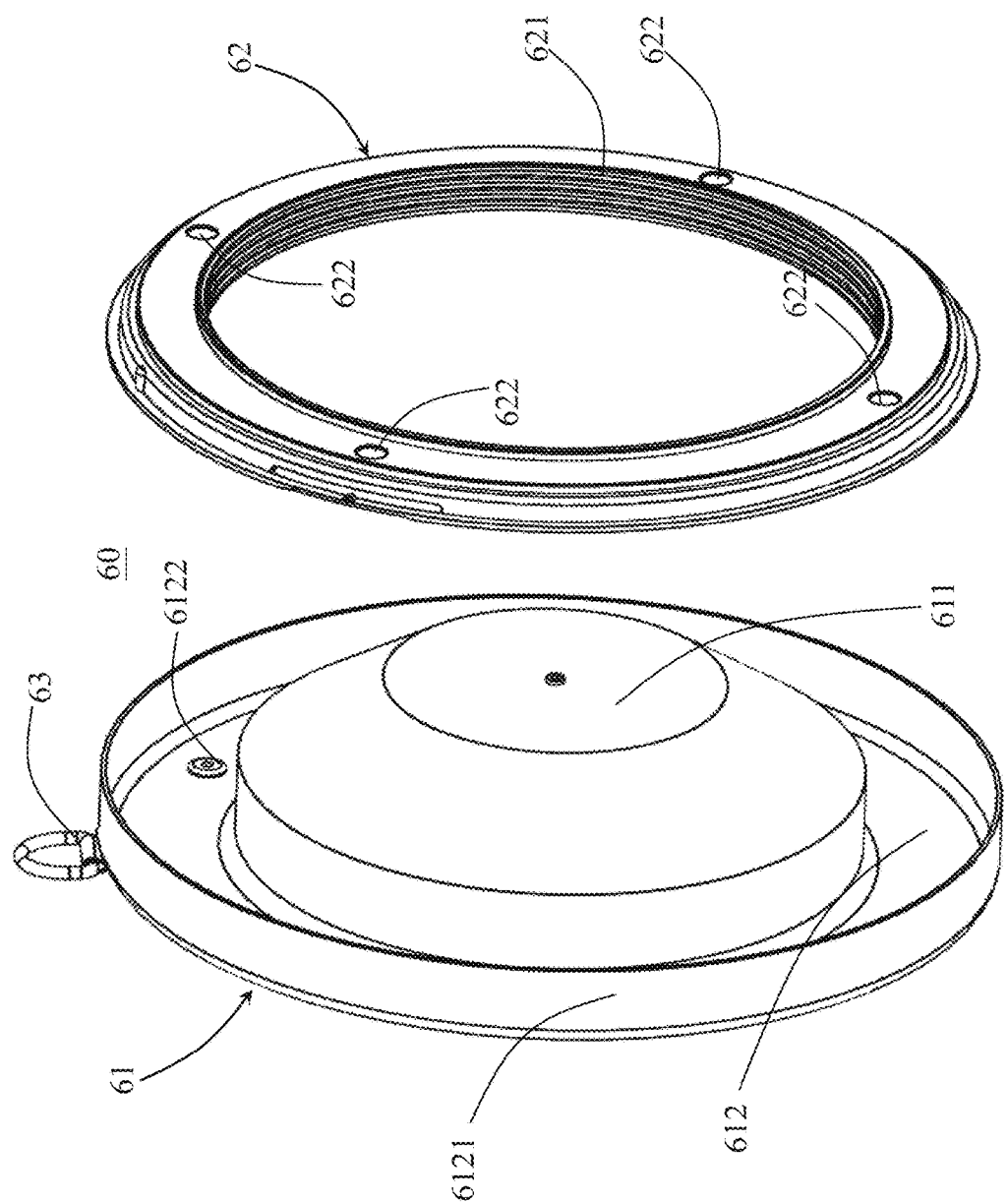
FIG. 11 is a stereogram showing a bottom flange and a second internal ring lid in a separated state.
Figure 12:
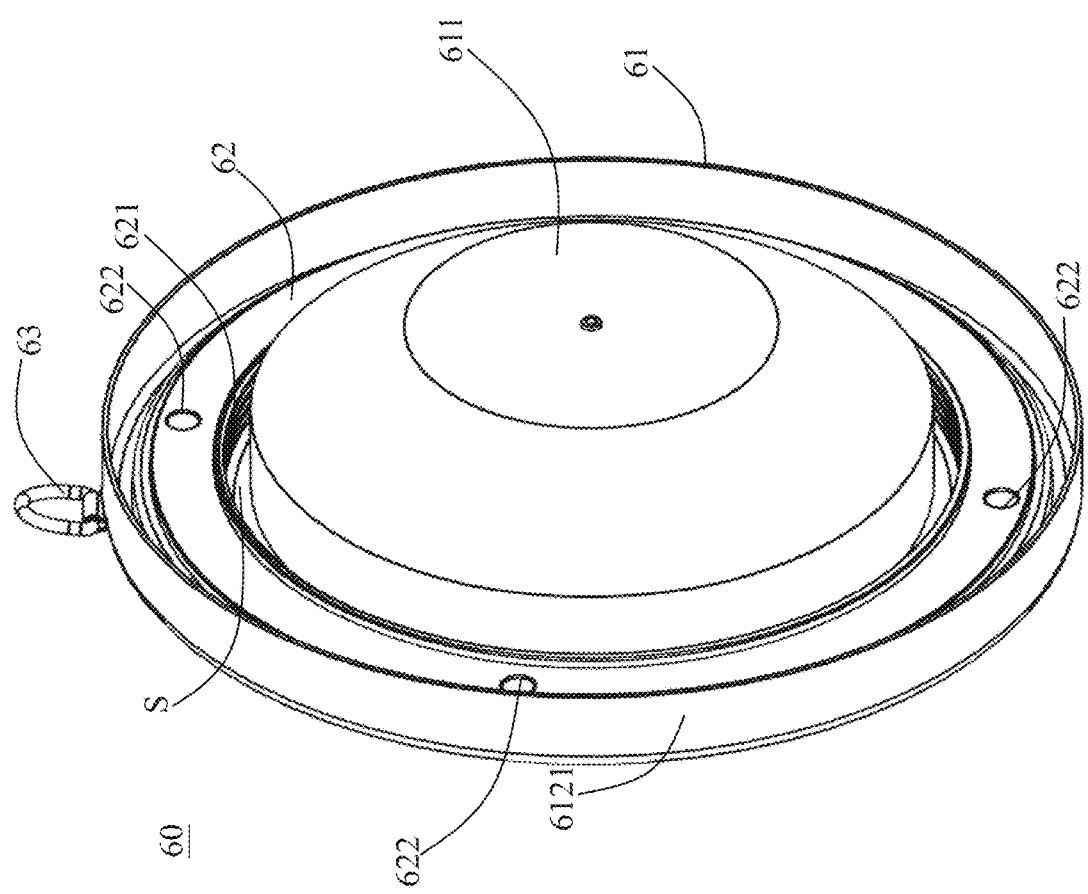
FIG. 12 is a stereogram showing the bottom flange and the second internal ring lid in a combined state.

See FIG. 11 and FIG. 12. FIG. 11 is a stereogram showing a bottom flange 61 and a second internal ring lid 62 in a separated state. FIG. 12 is a stereogram showing the bottom flange 61 and the second internal ring lid 62 in a combined state. The bottom flange 61 and the second internal ring lid 62 are the components of the bottom cover 60. The bottom cover 60 is connected to the other fixing ring 30 to seal one end of the reusable activated carbon filter 1. The bottom flange 61 comprises a center portion 611 and a center portion 611. The center portion 611 protrude to the inside of the inner mesh hollow cylinder 20. Namely, on the other side of the center portion 611, it forms a depression. The flange portion 612 is extended from the edge of the center portion 611 to the surrounding. The flange portion 612 has a second outer ring wall 6121 on the outermost. The second internal ring lid 62 has an internal thread 621 formed in an inner ring side of itself According to the present application, the second internal ring lid 62 is the same as the first internal ring lid 52. So, the internal thread 621 and the internal thread 521 are identical. The second internal ring lid 62 is fixed in a valley between the center portion 611 and the second outer ring wall 6121. The second internal ring lid 62 and the center portion 611 are not in close contact. A space S between the second internal ring lid 62 and the center portion 611 allows the inner ring wall 31 of the fixing ring 30 to be rotationally inserted with internal thread 621 detachably rotationally connected with the external thread segments 311 on the inner ring wall 31. This is the way the bottom flange 61 connects to the other fixing ring 30. A way to fix the second internal ring lid 62 is by screws screwed through the screw holes 622 on second internal ring lid 62 and fixed in the screw placement points 6122. The bottom cover 60 is located at the corner and edge of the reusable activated carbon filter 1. It is easily hit by external force. Therefore, the material of the bottom flange 61 must be solid. Like the top flange 51, the bottom flange 61 is also made of metal, such as steel or aluminum alloy (1060 grade). The second internal ring lid 62 is made of plastic, e.g., ABS.

The gap between the outer mesh hollow cylinder 10 and the inner mesh hollow cylinder 20 is narrow. Therefore, refilling activated carbon granules 2 is not convenient without a proper tool. The funnel 70 is such tool. The funnel 70 may be made of metal or plastic, e.g., ABS.

In order to fix the reusable activated carbon filter 1 on a building or any desired structure. Additional auxiliaries are required. A first hanging ring 52 is fixed on an edge of the flange portion 512. A second hanging ring 63 is fixed on an edge of the flange portion 612. Thus, the first hanging ring 53 and the second hanging ring 63 help hanging the reusable activated carbon filter 1 to two mount points, respectively.

Figure 13:
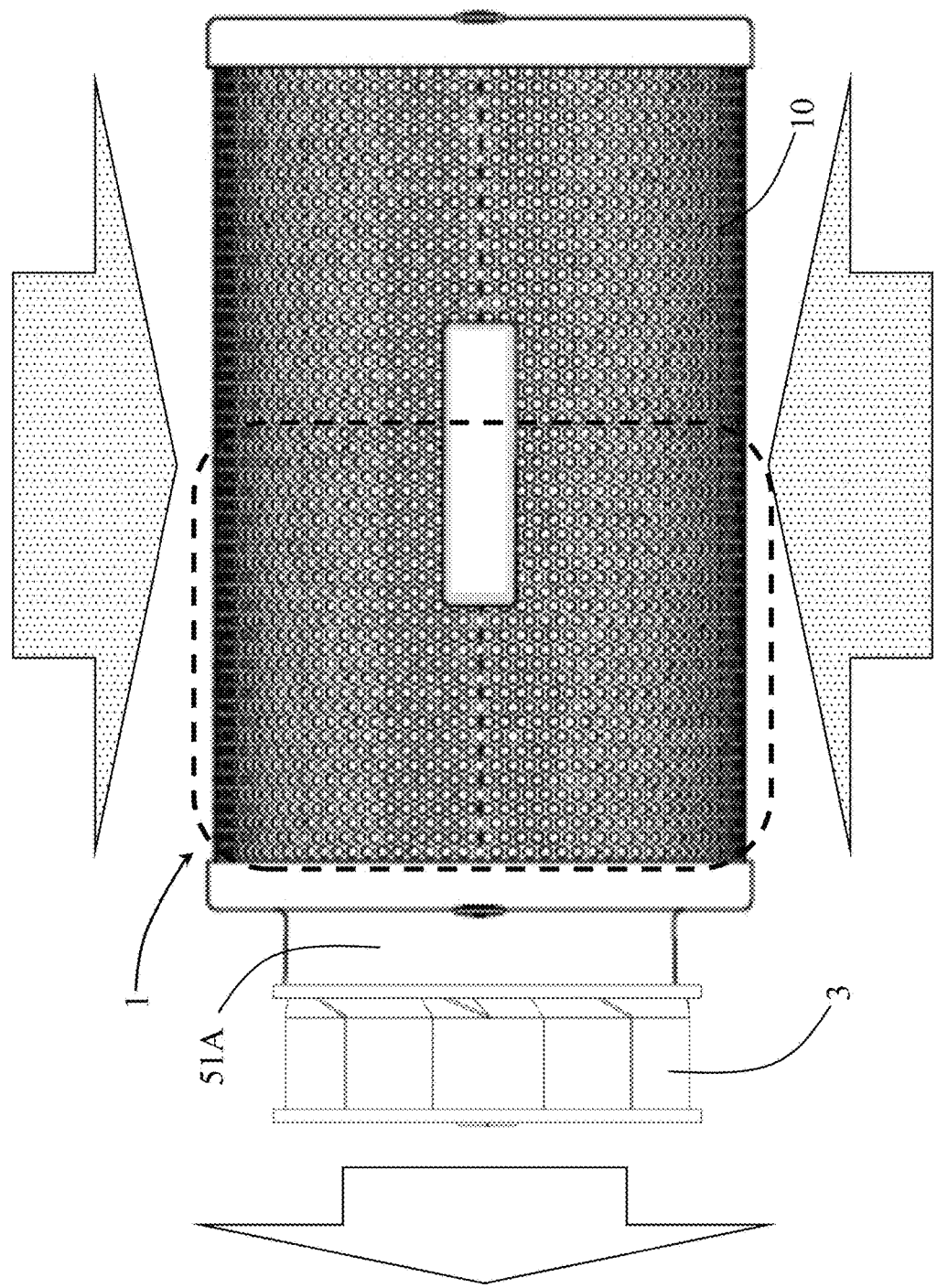
FIG. 13 shows an inline fan connects to a top connector at a connecting opening.

A connection form of an inline fan and the reusable activated carbon filter 1 is shown in FIG. 13. It shows an inline fan 3 connects to the top connector 50 at the connecting opening 51A. In this embodiment, when the inline fan 3 is turned on, external air goes into the reusable activated carbon filter 1 through the outer mesh hollow cylinder 10 (indicated by a direction of a dotted arrow in FIG. 6) and discharged from the inline fan 3 (indicated by a direction of a blank arrow in FIG. 6). In other embodiment, the direction of airflow may reverse. In fact, the connection of the inline fan 3 and the reusable activated carbon filter 1 may be indirect, e.g., through a pipe installed therebetween. Airflow mentioned above is ideal. According to fluid mechanics, most of the air goes in or out of the reusable activated carbon filter 1 through a concentrated portion of the outer mesh hollow cylinder 10 close to the inline fan 3. The concentrated portion of the outer mesh hollow cylinder 10 is marked by a dashed frame. It causes the activated carbon granules in the concentrated portion consume fast than that in the rest portion. When the activated carbon granules in the concentrated portion fail to work. The rest activated carbon granules may be still fresh. If it is not desired to replenish activated carbon granules due to material waste, the fresh activated carbon granules can be fully used without taking them off. As mentioned above, the second internal ring lid 62 is the same as the first internal ring lid 52. It means the locations of the top connector 50 and the bottom cover 60 can be interchanged. After the top connector 50 and the bottom cover 60 are interchanged, the activated carbon granules near the top connector 50 are fresh. Thus, the reusable activated carbon filter 1 can still work for a period of time until all activated carbon granules saturated.

Figure 14A:
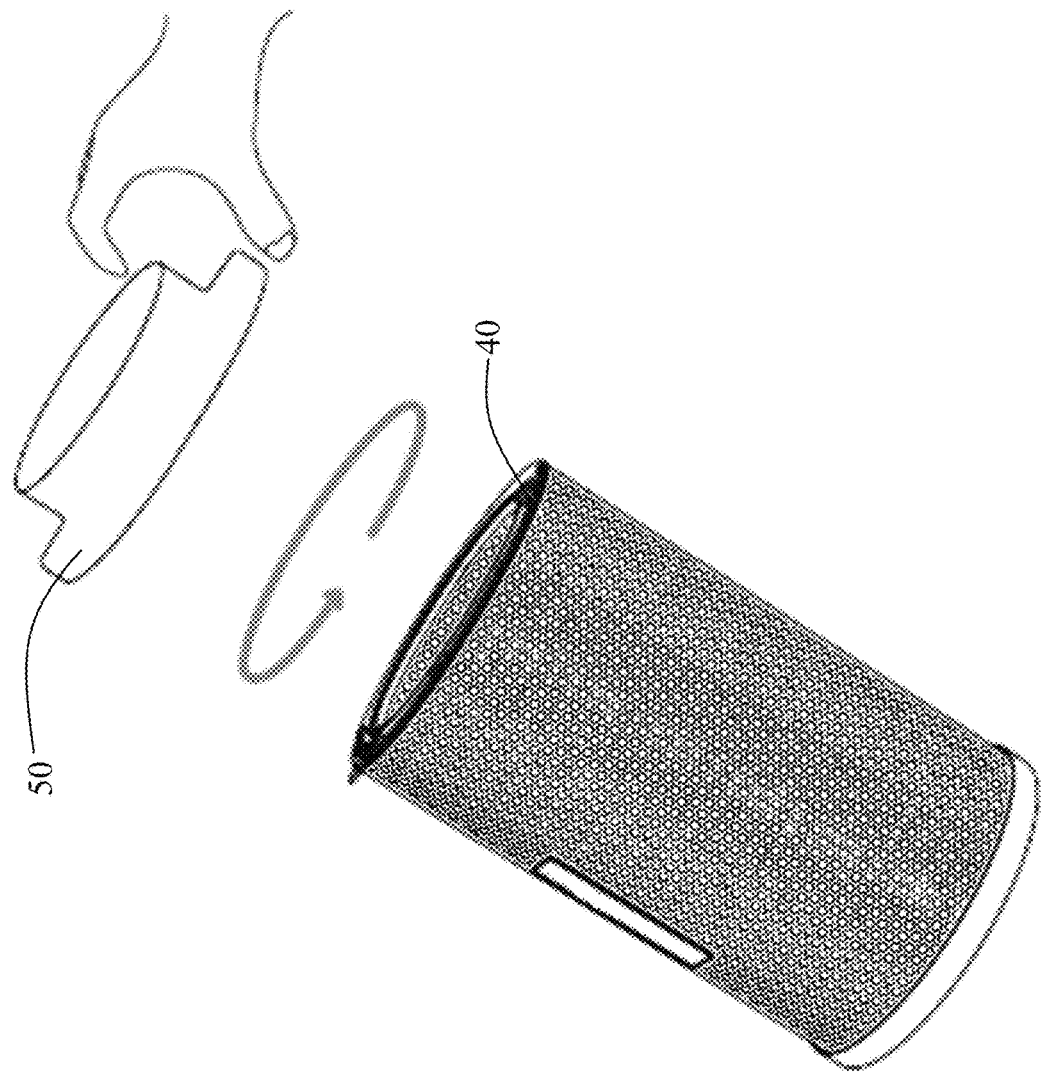
FIG. 14A, FIG. 14B and FIG. 14C show how the reusable activated carbon filter replenishes activated carbon granules.
Figure 14B:
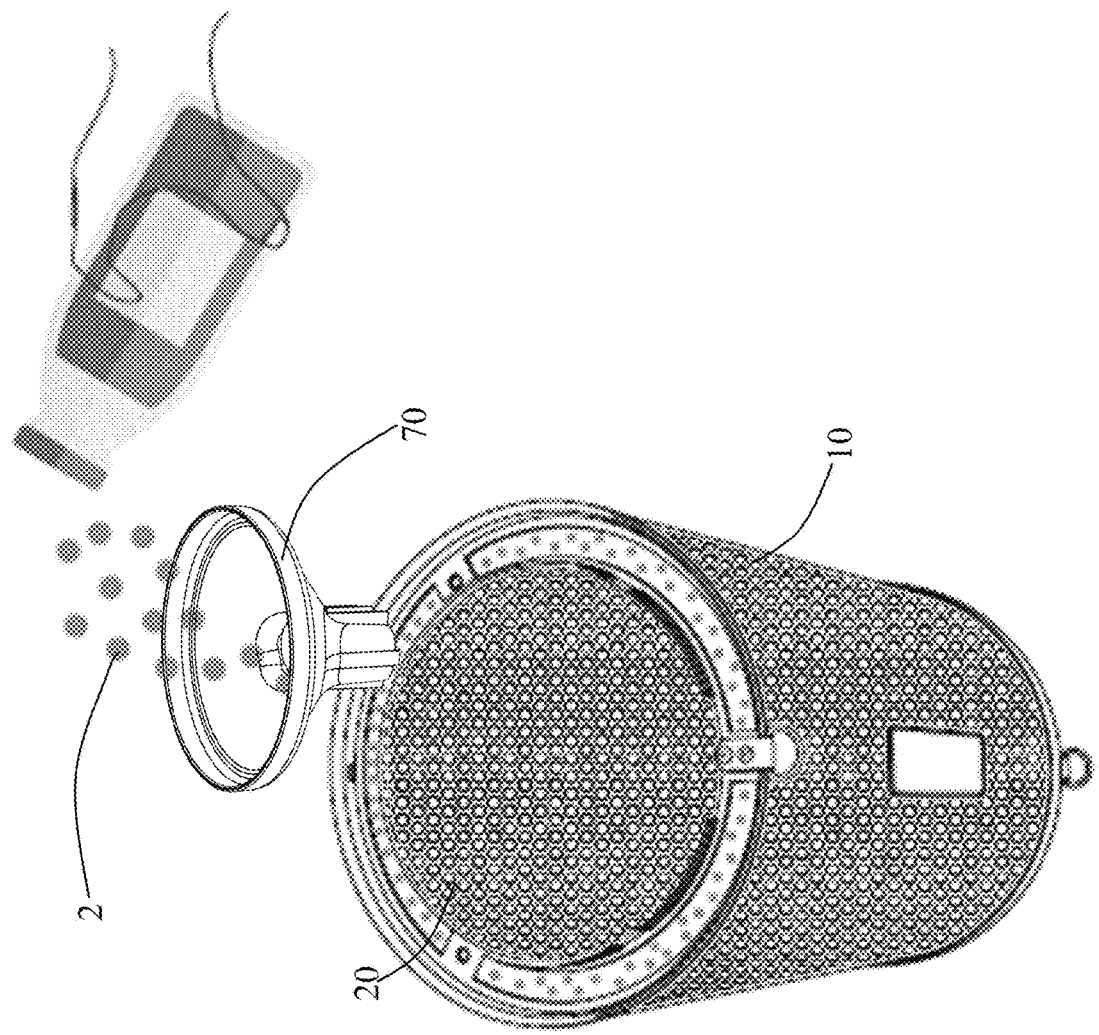
Figure 14C:
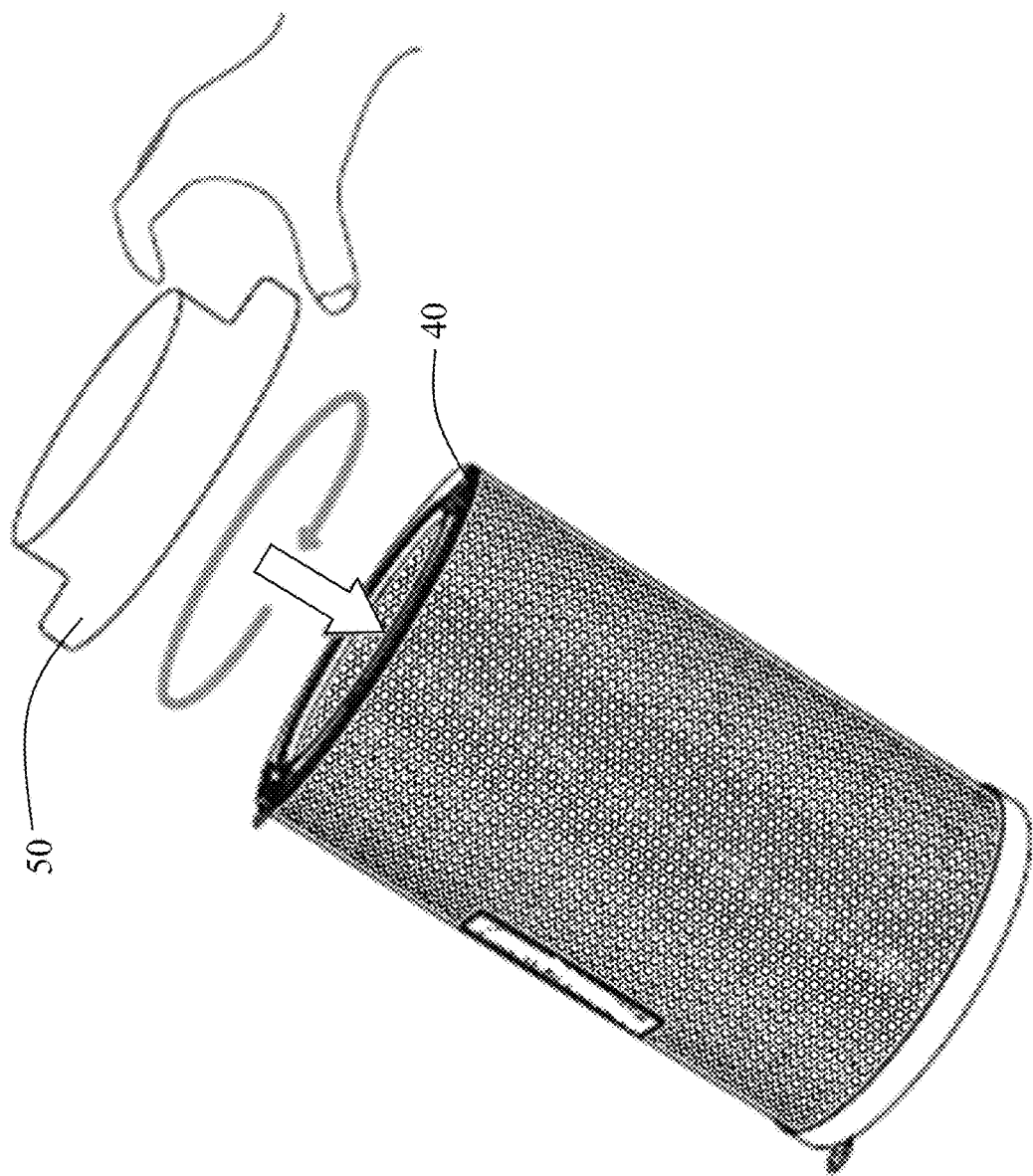

Refer to FIG. 14A, Fig, 14B and FIG. 14C. The figures show how the reusable activated carbon filter 1 replenishes activated carbon granules 2. First, remove the top connector 50 from the fixing ring 30 as shown in FIG. 11A. In this case, the top connector 50 and the fixing ring 30 are connected by thread structure on the contacted surfaces. Thus, just turn the top connector 50 counterclockwise relative to the fixing ring 30. Then, take out all saturated activated carbon granules 2 and leave the space between the outer mesh hollow cylinder 10 and the inner mesh hollow cylinder 20 empty. Use the funnel 70 to re-fill fresh activated carbon granules 2 to the empty space, as shown in FIG. 14B. Finally, lock the top connector 50 to the fixing ring 30, as shown in FIG. 14C.

While the application has been described in terms of what is presently considered to be the most practical and preferred embodiments, it is to be understood that the application needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A reusable activated carbon filter, comprising:
   an outer mesh hollow cylinder, having two ends with each end comprising a first opening, and a plurality of meshes formed thereon;
   an inner mesh hollow cylinder, having two ends with each end comprising a second opening, and a plurality of meshes formed thereon, located inside the outer mesh hollow cylinder;
   two fixing rings, each having a plurality of curved openings and a plurality of fixing holes, where one fixing ring fixes the outer mesh hollow cylinder and the inner mesh hollow cylinder at one end, and the other fixing ring fixes the outer mesh hollow cylinder and the inner mesh hollow cylinder at the other end;
   two flexible padding rings, where one of the flexible padding rings is associated with the one fixing ring and the other flexible padding ring is associated with the other fixing ring, wherein, each flexible padding ring comprises a plurality of fixing protrusions where each fixing protrusion detachably pads one of the curved openings;
   a top connector, removably connected to the one fixing ring, having a connecting opening for connecting to an inline fan; and
   a bottom cover, connected to the other fixing ring,
   wherein activated carbon granules are filled between the outer mesh hollow cylinder and the inner mesh hollow cylinder; an aperture of the plurality of meshes of the outer mesh hollow cylinder and the inner mesh hollow cylinder is smaller than the shortest external dimension of the activated carbon granules; the activated carbon granules are able to be replenished and removed through the curved openings.

2. The reusable activated carbon filter according to claim 1, wherein each fixing ring further comprises:
   an inner ring wall, having a plurality of external thread segments formed thereon;
   a first outer ring wall, concentrically formed outside the inner ring wall; and
   a plurality of connecting ribs, connecting the inner ring wall and the first outer ring wall,
   wherein a space enclosed by the inner ring wall, the first outer ring wall and two adjacent connecting ribs forms one curved opening.

3. The reusable activated carbon filter according to claim 2, wherein the top connector further comprises:
   a top flange, comprising:
      a pipe portion, forming the connecting opening; and
      a flange portion, extended from one end of the pipe portion, forming an annular groove; and
   a first internal ring lid, having an internal thread formed in an inner ring side thereof, fixed in the annular groove with the internal thread revealed for detachably rotationally connecting with the external thread segments of the one fixing ring.

4. The reusable activated carbon filter according to claim 3, wherein a first hanging ring is fixed on an edge of the flange portion.

5. The reusable activated carbon filter according to claim 2, wherein the bottom cover further comprises:
   a bottom flange, comprising:
      a center portion, protruding to the inside of the inner mesh hollow cylinder; and
      a flange portion, extended from the edge of the center portion, having a second outer ring wall; and
   a second internal ring lid, having an internal thread formed in an inner ring side thereof, fixed in a valley between the center portion and the second outer ring wall,
   wherein a space between the second internal ring lid and the center portion allows the inner ring wall to be rotationally inserted with the internal thread detachably rotationally connected with the external thread segments of the other fixing ring.

6. The reusable activated carbon filter according to claim 5, wherein a second hanging ring is fixed on an edge of the bottom flange.

7. The reusable activated carbon filter according to claim 2, wherein the first outer ring wall abuts the inside of the outer mesh hollow cylinder, and the inner ring wall abuts the outside of the inner mesh hollow cylinder.

8. The reusable activated carbon filter according to claim 1, wherein each flexible padding ring has a plurality of padding protrusions formed with the fixing protrusions on the same side, a shape of each padding protrusion is the same as that of one of the curved openings, and each padding protrusion is used to detachably pad one corresponding curved opening of one of the fixing rings.

* * * * *